United States Patent [19]

Kraus et al.

[11] Patent Number: 5,184,311
[45] Date of Patent: Feb. 2, 1993

[54] METHOD OF OPERATING AN INSTALLATION THAT COMPRISES ONE OR MORE LONG ELECTRICAL CONDUCTORS

[75] Inventors: Joseph S. Kraus, Stirling; Louis J. Lanzerotti, Morristown; Lester V. Medford, Murray Hill, all of N.J.

[73] Assignee: AT& Bell Laboratories, Murray Hill, N.J.

[21] Appl. No.: 540,434

[22] Filed: Jun. 19, 1990

[51] Int. Cl.$^5$ .............................................. G01V 3/08
[52] U.S. Cl. ................... 364/554.01; 364/483; 324/345
[58] Field of Search ............... 364/550, 551.01, 483, 364/420; 324/345, 348, 349, 350; 340/600, 601

[56] References Cited

U.S. PATENT DOCUMENTS 4,724,390  2/1988  Rauscher et al. ............ 324/345
4,825,165  4/1989  Helms et al. ................. 324/348

OTHER PUBLICATIONS

"Outage of the L4 System and the Geomagnetic Disturbances of Aug. 4, 1972", by C. W. Anderson III et al., *The Bell System Technical Journal*, vol. 53, No. 9, Nov. 1974, pp. 1817-1837.
"General Overview: Geomagnetic Storms and Electric Power System Effects", by V. D. Albertson, Dept. of Electrical Engineering, University of Minnesota, Minneapolis, MN Nov. 1989.
"Mitigation of GIC", by J. G. Kappenman and V. D. Albertson, Minnesota Power and University of Minnesota, Nov. 1989.
"Bracing for the Geomagnetic Storms", by J. G. Kappenman and V. D. Albertson, *IEEE Spectrum*, Mar. 1990, pp. 27-33.
"SESC Geomagnetic Services", by J. A. Joselyn and C. C. Balch, NOAA Space Environment Laboratory, Space Environment Services Division, Boulder, CO Nov. 1989.
"Solar Magnetic Disturbance—An Operator's Wish List", by G. A. Cucchi, PJM Interconnection Office, Norristown, PA Nov. 1989.
"Electromagnetic Study of the Atlantic Continental Margin Using a Section of a Transatlantic Cable", by L. J. Lanzerotti et al., *Journal of Geophysical Research*, vol. 91, No. B7, Jun. 10, 1986, pp. 7417-7427.

(List continued on next page.)

Primary Examiner—Parshotam S. Lall
Assistant Examiner—Michael Zanelli
Attorney, Agent, or Firm—E. E. Pacher

[57] ABSTRACT

The disclosed method of operating an installation that comprises one or more long electrical conductors (exemplarily an electric utility, telecommunication system or pipeline) involves receiving and/or collecting substantially real time data representative of the time derivative of Earth's magnetic field (dB/dt) at a multiplicity of points within an appropriate geographic region, comparing the data (or data derived therefrom) to pre-determined critical values and, if indicated by the result of the comparison, changing the operating conditions of the installation. Use of the disclosed method can make possible system-protective action in the case of solar magnetic disturbances (SMD). Such disturbances in the past have caused black-outs and other undesirable conditions. In a preferred embodiment the installation operator can have available dB/dt "maps" of a multiplicity of spatial scales, ranging from an essentially local scale to a substantial continental one. This not only can aid in the discrimination between operating difficulties due to "normal" causes (e.g., ordinary equipment failure) and difficulties due to SMD, but also can provide warning of impeding operating difficulties, such as possible increased power demand by a remote installation.

9 Claims, 5 Drawing Sheets

OTHER PUBLICATIONS

"Spectrum Estimation and Harmonic Analysis", by D. J. Thomson, *Proceedings of the IEEE,* vol. 70, No. 9, Sep. 1982, pp. 1055-1096.

"Transatlantic Earth Potential Variations During the Mar. 1989 Storms", by L. V. Medford et al., *Geophysical Research Letters,* vol. 16, No. 10, Oct. 1989, pp. 1145-1148.

"Geomagnetic Induction Effects in Ground-Based Systems", by L. J. Lanzerotti, *Space Science Reviews,* 34 (1983), pp. 347-356.

"Geomagnetic Influences on Man-made systems", by L. J. Lanzerotti, *Journal of Atmospheric and Terrestrial Physics,* vol. 41, pp. 787-796 (1979).

"Geomagnetic Induction on a Transatlantic Communications Cable", by L. V. Medford, *Nature,* vol. 290, No. 5805, Apr. 2, 1981, pp. 329-393.

"Weathering Geomagnetic Storms over the Long Haul", by L. J. Lanzerotti, IEEE Spectrum, Mar. 1990, pp. 32-33.

METHOD OF OPERATING AN INSTALLATION THAT COMPRISES ONE OR MORE LONG ELECTRICAL CONDUCTORS

FIELD OF THE INVENTION

This invention pertains to methods of operating installations or systems that comprise long electrical conductors. Exemplary of such installations or systems are electrical power grids and telephone systems.

BACKGROUND OF THE INVENTION

It has been known since the middle of the nineteenth century that geomagnetic storms can affect the operation of systems that comprise long electrical conductors. A written report of the adverse effects of one such storm on electrical power systems was published in 1940. Among the noted effects were tripped transformer banks, blown transformer fuses, reactive power surges, and significant currents on neutral lines.

More recently, on Mar. 13, 1989 the Hydro-Quebec power system collapsed, with significant damage to equipment. It took more than 9 hours to restore 83% of full power. Among the damaged equipment were generating station step-up transformers, shunt reactors, thyristors and capacitor banks. It is now considered a certainty that this black-out was caused by a magnetic storm.

Geomagnetic storms, also referred to as solar-magnetic disturbances (SMDs), can cause the flow of large currents in appropriately located and oriented conductors on Earth's surface. These "geomagnetically-induced currents" (GICs) can cause, inter alia, severe offset saturation of power system transformers, which in turn can result in overheating. Furthermore, the saturation results in the introduction of harmonic currents into the system. These harmonics can overload capacitor banks and cause misoperation of static power devices. Relay and protection systems are also affected by the harmonic currents. These and other effects of SMDs can result in severe system disruptions, exemplified by the above referred to black-out of Mar. 13, 1989.

Electrical power installations are not the only installations that have in the past been affected by SMDs. For instance, an outage of a link of the L4 continental coaxial telephone cable occurred on Aug. 4, 1972 during a large geomagnetic storm, and is believed to have been caused by the storm (C. W. Anderson III et al., *The Bell System Technical Journal*, Vol. 53(9), pages 1817-1837). Disruptions due to SMDs have also occurred on oceanic telecommunications cables.

A considerable amount of research has been conducted on SMDs, on their effect on electrical power and telephone systems, and on ways to mitigate the effect of GICs on such systems. See, for instance, V. D. Albertson and J. G. Kappenman et al, both in *Conference on Geomagnetically Induced Currents*, Nov. 8-10, 1989, Burlingame, Calif. (both incorporated herein by reference). See also the article by J. G. Kappenman et al. in *IEEE Spectrum*, pp. 27-33, March 1990, also incorporated by reference.

J. A. Joselyn et al. (also incorporated herein by reference), at the same conference (which was sponsored by EPRI, the Electric Power Research Institute), reviewed SMD-related services provided by SESC, the Space Environment Services Center, a joint operation of the U.S. Department of Commence and the U.S. Air Force. The SESC collects data on natural variations in Earth's magnetic field (B) and converts these data to the so-called "K index", a number from 0 to 9. K index values are determined at 3-hour intervals, and neither contain any information on the time rate of change of B nor do they contain information on the spatial scale of a disturbance, except possibly on a very large (more than 1000 km) scale. If the observed K index for Boulder, Colo. (SESC is located in Boulder) exceeds 4, 5 or 6, SESC issues "alerts" to selected institutions that include some electric utilities. Such an alert informs the recipient that a disturbance has occurred, and that additional K's or 4 are expected for the next 12 hours. SESC also issues alerts (based on a running index based on the eight most recent K index values) that inform recipients that the disturbance has lengthened into a storm.

Those skilled in the art will know that SESC's alerts are based on past events and do not provide a basis for reliably anticipating severe future SMDs that could affect the operation of power grids and other systems comprising long electrical conductors. Indeed, operators of such systems currently generally are not aware of the occurrence of SMDs. G. A. Cucchi of the PJM Interconnection Office, in a paper (also incorporated herein by reference) at the above referred-to EPRI Conference, stated the following: "On Mar. 13, 1989 at 0245 EST the Hydro Quebec System went black. It was not until 0400 EST that operators realized that a Solar Magnetic Disturbance (SMD) of K9 intensity had occurred and was probably the cause of thousands of customers in Quebec Province being without electricity for up to nine hours." The author went on to relate that the SMD resulted in a loss of nearly 1,000 MVARs, (megavoltampere reactive) and that " . . . plant personnel throughout North America described transformers sounding like jet aircraft".

But even if operators were aware of recent significant SMDs, this typically would not permit the timely taking of preventive action. G. A. Cucchi (op. cit.) has stated as follows:

"Operating procedures fall generally into two categories, namely, preventive action and corrective action. The key to preventive action is the ability to forecast the event with sufficient accuracy and lead time. The "K" and "A" alerts and warnings which have been issued by the NOAA's Space Environment Services Center (SESC) in Boulder, Colo. and by the Geophysics Division, Geological Survey of Canada, Energy, Mines and Resources (EMR) in Ottawa, Ontario are simply not adequate for the power system problem. Both scales, for example, represent average conditions over three and 24 hours, respectively. The three-hour or K scale is used most often, particularly to report past conditions. The open-ended, logarithmic K scale covers a wide range of activity at the highest or K9 level. On the power system, I have seen K9 events go unnoticed where, most recently, on Sep. 19, 1989, a K7 storm has caused damage to transformers and system components."

Cucchi further states that the presently available alerts are not very useful, and goes on to say:

"For SMD protection, the likely operating procedures would involve protecting the voltage profile of the system and protecting against transformer damage. Normally, system operation protects against the most severe single contingency. To protect against multiple capacitor trippings and the resultant VAR loss, operators would unload transmission by reducing economic transfers to maintain an abnormally safe voltage profile. To protect against transformer damage, operators would dispatch selected generators to minimum loading levels or, in the extreme, remove the generator from the network. We estimate in PJM, for example, that since Mar. 13, 1989 if we responded to every K alert of level 5 or greater, PJM would have spent over $100 million in excess incremental operating costs." After expressing the desire for accurate forecast data designed specifically for the needs of the electric power system, Cucchi states as follows:

"If forecasting accuracy cannot be improved, operating procedures must lean toward corrective action. For example, if SMD had a unique signature that would respond to pattern recognition, a human or a computer could respond to the beginnings of an event. Five to ten minutes notice would be sufficient to reconfigure the system dispatch to a more secure state . . . . "

In view of the immense economic significance of avoidance or mitigation of the effects of SMDs on the electric power grid and other installations that comprise long electric conductors, a method of operation of such an installation that comprises obtaining data that permits taking installation-protective action would be of great importance. This application discloses such a method.

SUMMARY OF THE INVENTION

In a broad aspect the invention is a method of operating an installation that comprises one or more long electrical conductors. The method comprises obtaining data, including substantially real-time data on, or related to, the time rate of change of Earth's magnetic field. Such data can be indicative of possible future events that can result in significant GICs in the conductor and/or in equipment connected to the conductor. Typically the method comprises comparing all or part of the data, or of data derived therefrom, to predetermined critical values and, if indicated by the comparison, taking installation-protective action. Exemplarily this involves changing the operating conditions of the installation to make the installation less vulnerable to the effects of GICs.

By "long" conductors we mean herein conductors (typically terrestrial or submarine cables, or overhead lines, but not excluding pipelines) that have a length between grounding points that makes them susceptible to the effects of SMDs. In most cases the distance between grounding points will be at least 1 km but, more typically, the conductors will be tens or even hundreds of kilometers between grounding points, extending typically over a large geographic region. Exemplarily, the installation is the power distribution system of one or more electric utility companies, or a communication system, e.g., comprising a transoceanic telephone cable. Such an installation generally comprises, in addition to the conductor(s), means for causing the flow of electrical current in the conductor(s) and, optionally, means for utilizing the electrical current. Examples of the former means are power generators and step-up transformers, and an example of the latter is a step-down transformer connected to a high voltage transmission line. If the conductor is a pipeline, then the means for causing the flow of electrical current are cathodic protection means that seek to cancel naturally induced currents in the pipeline.

By "substantially real-time" data we mean herein measurement results that can be available for comparison with the critical values at substantially the same time the measurement is made, typically within less than 5 minutes of the measurement.

Exemplarily, the method comprises receiving (e.g., from one or more remote sensing stations) and/or collecting (locally or remotely) data that is representative of the time derivative of Earth's magnetic field at or near Earth's surface (not excluding data from low orbit satellites) at a multiplicity of locations, typically including one or more locations within the geographic region associated with the system. The derivative will be designated herein as dB/dt, where B (Earth's magnetic field) is a vector. In some cases it will not be necessary to measure all three components of dB/dt.

Exemplarily the method further comprises comparing the received and/or collected data (especially the dB/dt data), or quantities derived from the data, with pre-determined critical values and, if indicated by the comparison, making preventive or corrective changes in the operating conditions of the installation.

A significant aspect of the inventive method is the use of substantially real-time dB/dt data as input data. It has been found that relatively large values of this physical quantity frequently are temporally associated with significant SMDs.

More particularly, it has been found that frequently a relatively pronounced short term increase in dB/dt [to be referred to as SSC (sudden storm commencement) signal] precedes a significant SMD, typically by times ranging from minutes to many hours. Detection of a SSC signal thus can serve to trigger an alert or any other appropriate change that prepares the system for the possible occurrence of SMD-related abnormal conditions. The occurrence of a SSC signal typically will be ascertained through comparison of measured dB/dt data with pre-determined critical values.

Furthermore, it has been found that relatively high values of dB/dt that persist over relatively long (compared to typical SSC signals) periods typically occur prior to and during significant SMDs. Whether or not protective action is required typically is determined through comparison of the measured dB/dt data (or of data related to it; e.g., a real-time "map" of dB/dt for a given geographic region) with pre-determined critical values.

Use of essentially real-time dB/dt data typically makes possible more reliable assessment of the imminence and/or severity of future SMD-related events that can affect the operation of a given installation than is offered by the prior art approach that typically relied on local data based on past (3-24 hours) values of B, and which typically did not use data of dB/dt.

Optionally the dB/dt data can be supplemented by data on the voltage induced on a given long conductor, thereby providing additional information on the global aspects of changes in Earth's magnetic field. Such information can assist in the discrimination between local and global disturbances. By a "global" aspect or disturbance we mean herein an aspect or disturbance that extends over a significant geographic region, (exemplarily at least about $10^4 km^2$) but not necessarily over a region as large as a continent or a hemisphere. However, discrimination between local and global aspects or disturbances does not require the above referred-to voltage data. For instance, in a particular embodiment of the invention the relevant dB/dt data is displayed in real time in conjunction with a "map" of the installation. Exemplarily this is done by means of contour lines of equal values of dB/dt superimposed on a representation of a geographic region that contains all or part of the installation. In this embodiment an operator of the installation can at a glance determine whether an observed unusual operating condition is likely to be due to a local aspect (e.g., an equipment malfunction) or to a global disturbance (e.g., a SMD).

Currently preferred embodiments of the inventive method comprise the possibility of obtaining data representative of changes in Earth's magnetic field over a variety of spatial scales, exemplarily ranging from continent scale to a local scale that encompasses only a portion of the installation. Such data can advantageously be displayed in conjunction with maps of the relevant geographical regions, e.g., as contour lines of equal dB/dt superimposed upon a map of the region of interest. Having available the capability of monitoring the temporal and spatial changes in dB/dt over a variety of spatial scales, including over a large area (e.g., the northern portion of North America) enhances the ability of a system operator to anticipate significant SMD-related problems, and to take timely appropriate action. For instance, such a capability can enable an operator to anticipate increased demand for power from a neighboring utility, or the possibility of load shedding by a neighboring utility. And, of course, such a capability makes it possible for an operator to monitor the approach of a disturbance in Earth's magnetic field towards the operator's geographic region.

It will be appreciated that the invention can be embodied in ways that differ in detail. For instance, the dB/dt data itself need not be supplied to the operators of a given installation, but instead could be analyzed in a central facility that has available to it the relevant facts about the given installation. The analysis of the data typically would involve the comparison of the data with the pre-determined critical values. If indicated by the results of the comparison, an alert could be transmitted from the central facility to the installation, with appropriate action then being taken by the operators of the installation.

DETAILED DESCRIPTION OF AN EXEMPLARY EMBODIMENT

A significant aspect of the instant invention is the provision of data on the rate of change of the earth magnetic field (dB/dt), preferably for a variety of spatial scales, typically to personnel or equipment involved in the operational control of a relevant installation, e.g., of the generation and distribution system of an electric utility. (Although use of the inventive method is not limited to electric utilities, the remainder of the discussion herein will primarily be in terms of embodiments that involve the operation of an electric utility installation. No limitation is implied thereby.) Below is described an exemplary embodiment of the invention.

Data acquisition typically involves a multiplicity of magnetometers. Such instruments are well known to those skilled in the art and require no detailed discussion. Exemplarily, the magnetometers are of the fluxgate type with at least 2 nanoTesla sensitivity, exemplarily Nanotesla Inc., Model LNV01. At a given data collection station (DCS) the time rate of change of the magnitude of B could be determined (a scalar quantity), or the rate of change of one or more of the directional components of B could be determined. The latter is generally somewhat more difficult to implement but typically can provide more information. (Operationally, the measured quantity will frequently be Earth's magnetic field as a function of time). Optionally, at a given DCS further relevant data could be obtained. This could be the value of the voltage induced on a long cable or other long conductor, the magnitude of the current on the neutral conductor of an electric power transmission line, and/or the local Earth's electrical potential.

Figure 1:
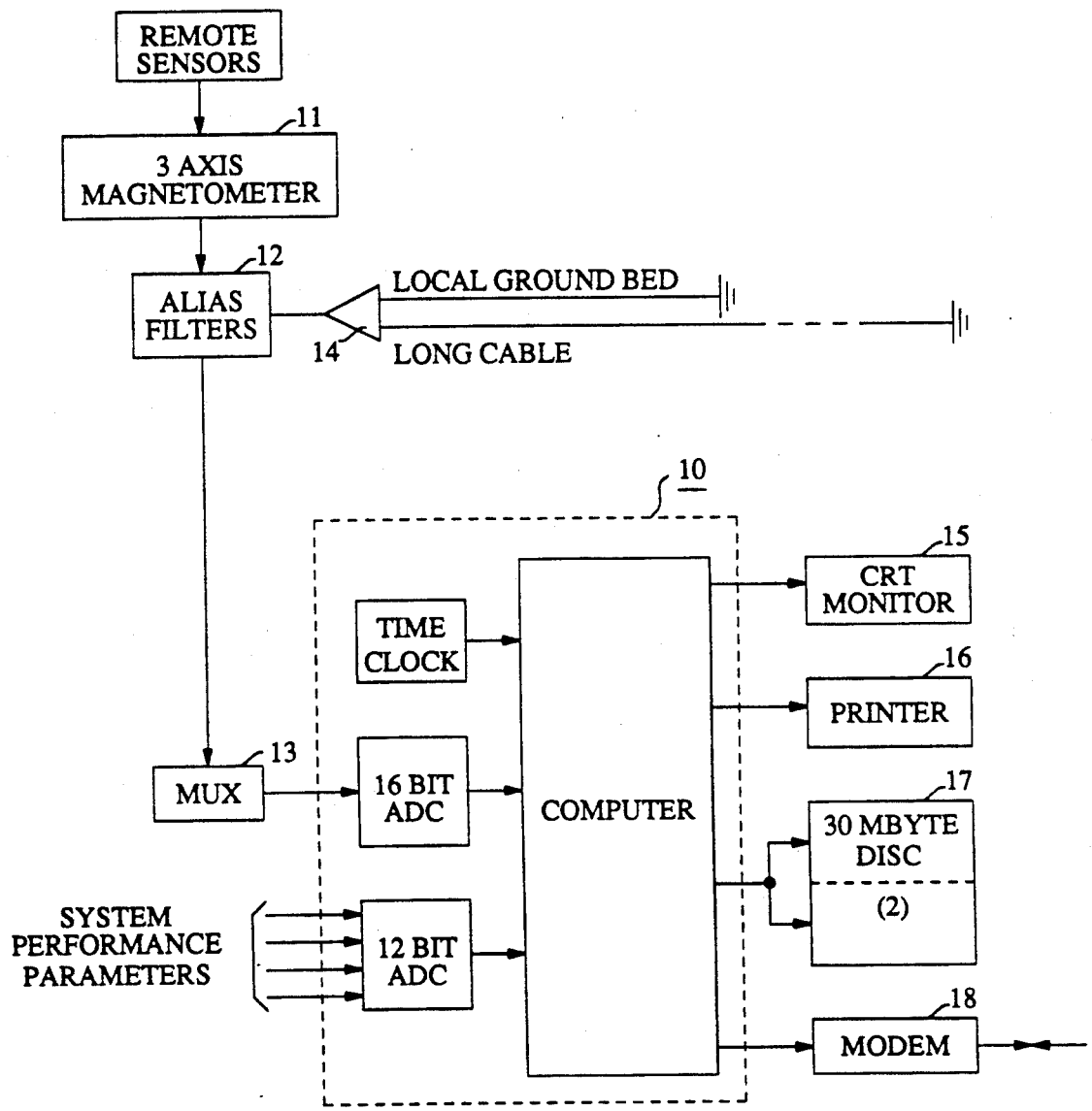
FIG. 1 schematically shows exemplary apparatus for a data collection station useful in the practice of the invention.

Exemplary instrumentation of a DCS is schematically shown in FIG. 1, wherein numeral 10 refers to a PC-based data processing unit that comprises, in addition to the PC, a 16-bit A/D converter, a 12-bit A/D converter, and a time-of-day clock. Signals from one or more 3-axis magnetometers 11 [and, optionally, from one or more instruments 14 that measure induced cable voltage ($V_c$) and/or earth potential (E)] are filtered in alias filters 12, multiplexed in multiplexer 13, digitized in the 16-bit converter, and the digitized signals are provided to the PC, together with the output of the time-of-day clock. Exemplarily, data collection is under interrupt control and operates at a data rate in the range 0.1-2 Hz.

Advantageously, system performance parameters (e.g., power supply voltage, temperature) are also collected, to maintain system reliability and track long term effects. Such data can be collected at substantially lower rate (e.g., once every 20 minutes), is exemplarily digitized in a 12-bit converter, and the digitized data provided to the PC.

Optionally the incoming data can be displayed at the DCS in real time, with the PC providing the signal (or signals) representative of dB/dt (and possibly $V_c$, $dV_c/dt$ and/or E) to monitor 15. The data can also be recorded by means of printer 16. Typically it will be desirable that the collected data is also stored, to be available for future analysis. This can advantageously be done by means of conventional disk storage 17. The data collected and processed by the DCS typically is provided in real time to a receiving station, typically via modem 18, or via a dedicated line. Optionally, pre-set limits can be set such that, if any data or performance parameter exceeds the relevant limit, an alarm can be given at the DCS and/or at the receiving station. To insure high reliability the DCS apparatus desirably is supported by an uninterruptible power supply.

Apparatus for a DCS can be conventional, and those skilled in the relevant art are familiar with such apparatus and with the way the individual pieces of apparatus co-operate to achieve the desired end.

Figure 2:
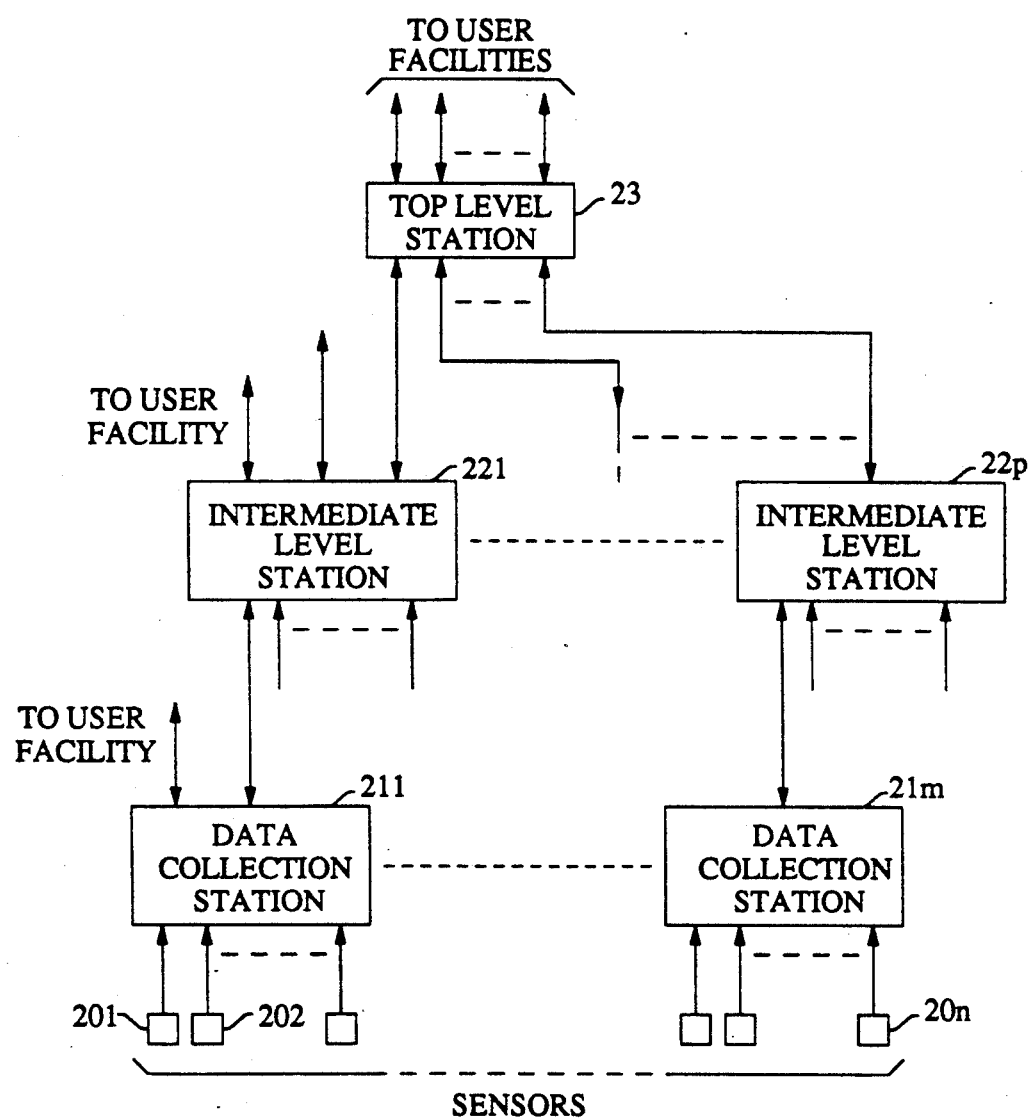
FIG. 2 schematically depicts an exemplary hierarchical data collection network useful in the practice of the invention.
Figure 3:
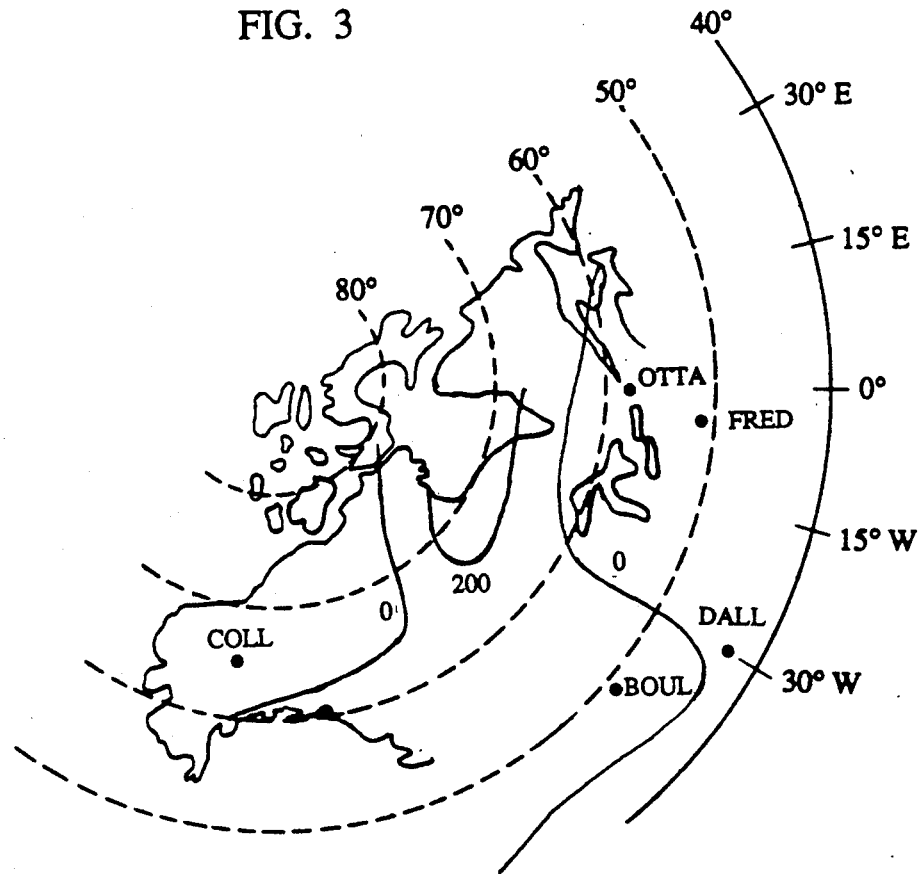
FIGS. 3-7 show a time sequence of the north/south component of dB/dt over a large portion of North America.
Figure 4:
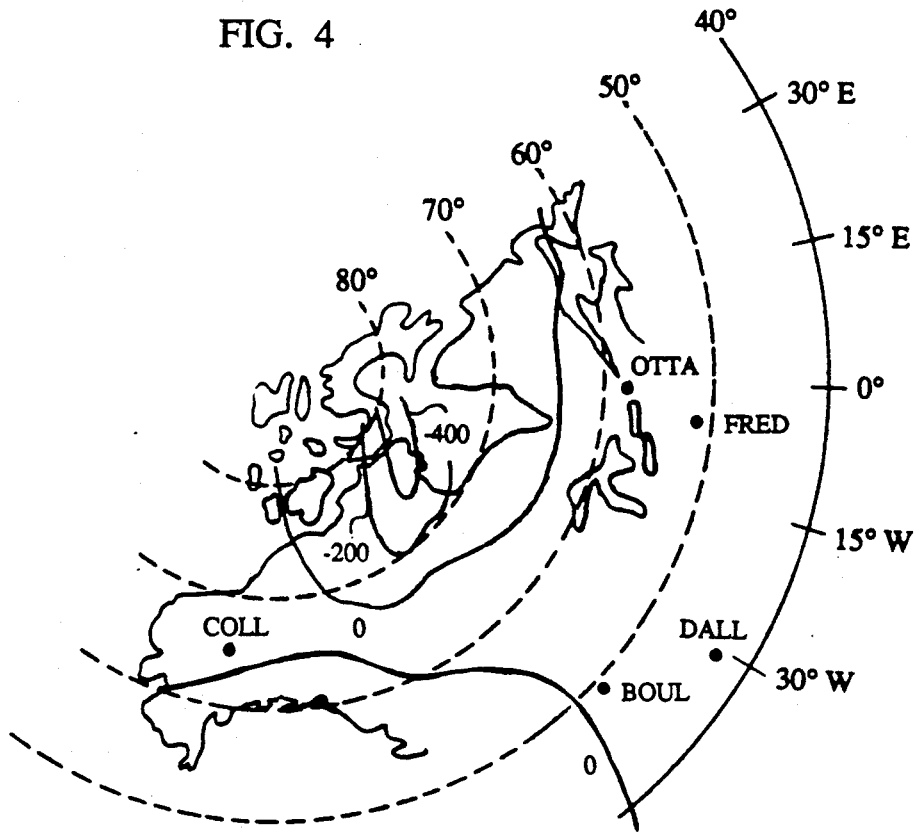
Figure 5:
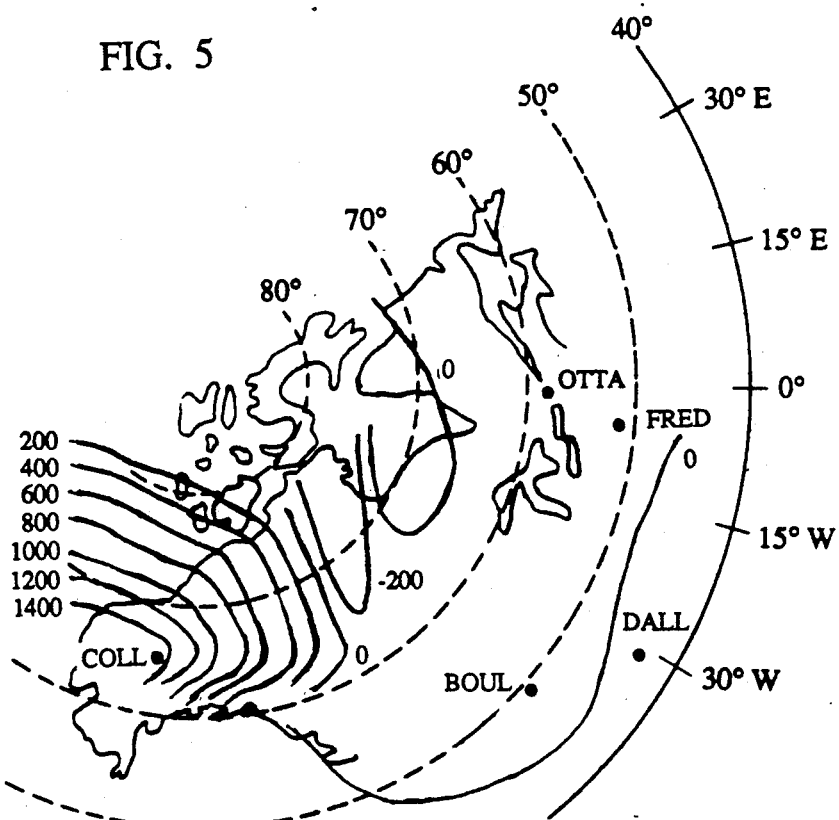
Figure 6:
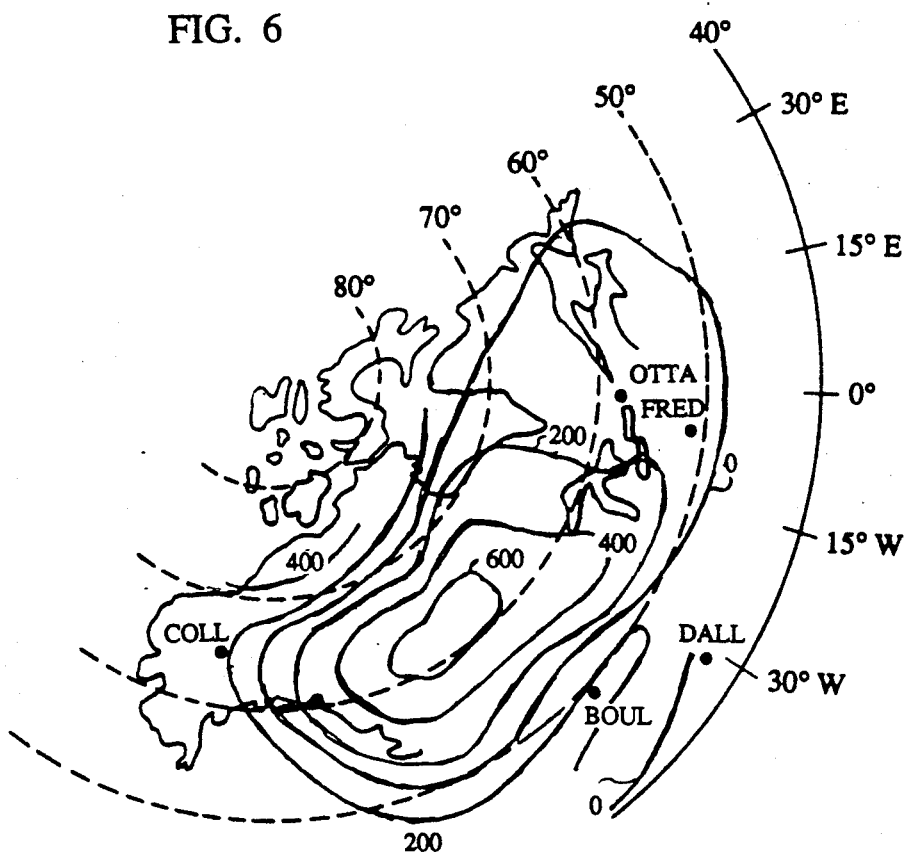
Figure 7:
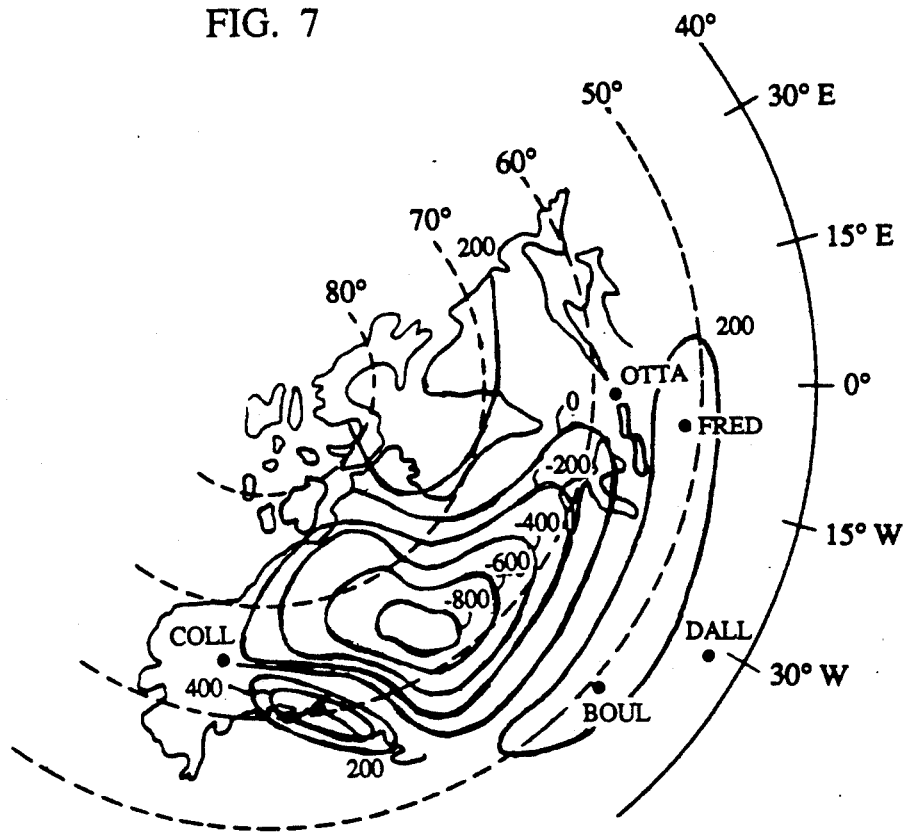

Data streams from one or more DCS can optionally be provided directly to a receiving station associated with a given electric utility or other installation, and/or can be provided to a receiving station associated with a further level of the data-collection network. This further level can be either an intermediate level or the top level. An exemplary hierarchical data collection network is schematically depicted in FIG. 2, wherein n sensors (201-20n) provide data to m DCS (211-21m; typically m≦n). As shown in FIG. 2, p intermediate level stations (221-22p; typically p≦m) receive consolidated data from the DCSs and in turn provide further consolidated data to top level station 23 (and, optionally, to one or more user facilities), which in turn provides data to one or more user facilities.

An exemplary embodiment of a data collection system of the type shown in FIG. 2 can cover a large geographic region, e.g., the 48 contiguous states of the United States, or perhaps the northern half of the 48 states together with an adjacent portion of Canada. Exemplarily, DCS might be spaced about 100 km apart, and the intermediate level stations might be spaced about 500 km apart. DCSs thus can be used to monitor (and characterize) relatively small-scale effects. For instance, it is known that the geology of a region can be a factor that can influence the severity of the effects due to a given SMD. For instance, induced voltages on long conductors tend to be more severe in low conductivity regions, e.g., the Canadian Shield region. Thus, data collected by a given DCS can be used to characterize the influence of the geology of the region covered by the DCS's sensors on the relevant installation. For instance, if the region covered by the sensors is a low conductivity region, then system-protective measures typically would have to be taken for lower values of dB/dt, compared to a higher conductivity region. Thus, exemplarily, the "critical values" of dB/dt typically would be set at a lower value in a low conductivity region than in a higher conductivity region.

It will be understood that the presence of intermediate and top level stations is optional. Similarly, there could be more than one level of intermediate level stations.

Those skilled in the art know techniques for estimating a "critical" value of a parameter (e.g., a voltage V on a cable or on the ground line in a transformer) at a given location in an installation. See, for instance, D. J. Thompson, *Proceedings of the IEEE*, Vol. 70, p. 1055 (1982); and L. J. Lanzerotti et al., *Journal of Geophysical Research*, Vol. 91, p. 7417 (1986), both incorporated herein by reference. Exemplarily, a "critical" value of the voltage V is estimated by minimizing the expression $$V(\omega) = A_H(\omega)B_H^*(\omega) + A_D(\omega)B_D^*(\omega) + A_Z(\omega)B_Z^*(\omega) + \epsilon(\omega)$$

where $\omega$ is frequency, $V(\omega)$ is the Fourier transformed voltage, $A(\omega)$ is an appropriate transfer function, $B^*(\omega)$ is the Fourier transformed time derivative of Earth's magnetic field at a given location, and $\epsilon(\omega)$ is the "error" to be minimized. Subscripts H, D, and Z refer, as is conventional, to the north/south, east/west, and vertical components, respectively.

Carrying out such an analysis for several locations in a region of interest, one can obtain a map of A's and thereby set limits all across the region. Furthermore, it is anticipated that the above described process will be iterated, taking into account installation performance data of the installation accumulated over time, together with historical data of dB/dt, Earth's potential, etc.

The type of data obtainable by means of a network as described above is exemplified by FIGS. 3-7, which show exemplary historical (Aug. 4, 1972) data of the time rate of change of Earth's magnetic field in the north/south direction over a major portion of North America. The figures show the data in approximately one minute intervals, with each contour interval representing a difference of 200 nanoTesla/minute. Latitude lines and some locations (Ottawa, Canada; Fredericksburg, Va.; Dallas, Tex.; Boulder, Colo.; and College, Ak.) are shown to aid in understanding. From the figures it is evident that major changes in dB/dt can occur over very large geographic regions within a short time. Those skilled in the art will also recognize the value of having available data of the kind shown in FIGS. 3-7, or of data related thereto, especially if such data is available in real time, continuously and, desirably, for a multiplicity of spatial scales, since such data can contain a plethora of information useful for the operator of an installation of the type relevant to this application.

Figure 8:
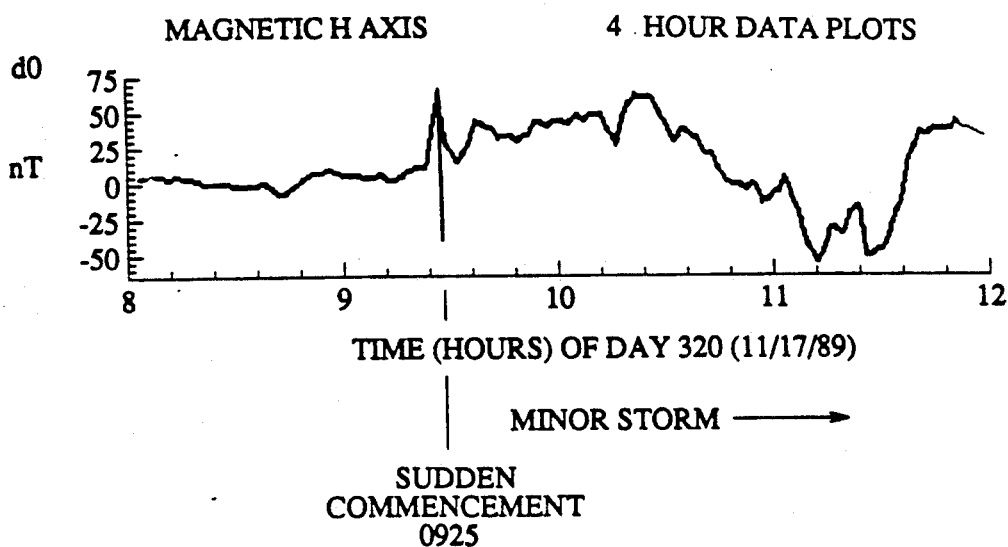
FIG. 8 shows exemplary data of the north/south component of Earth's magnetic field at a given location, as a function of time.

FIG. 8 shows exemplary data of the north/south component of Earth's magnetic field in nanoTesla as a function of time, over a six hour period on Nov. 17, 1989. The data shows a sudden storm commencement signal at 0925, which was followed by a minor magnetic storm. Clearly, detection of a SSC signal can alert the operator of an installation of the type relevant to this application that a SMD has commenced or is likely to commence. The other two components of B were also measured (as was the voltage on a long cable) and show qualitatively similar behavior. As those skilled in the art will know, it is a trivial task to derive dB/dt data from data of B as a function of time.

If comparison of the relevant data with the predetermined critical values indicates that the installation should be put into a condition of lowered vulnerability to the effects of geomagnetically induced currents then appropriate changes in the alert status and/or operating conditions will generally be made. The details of these changes will typically be installation specific. However, for an electric power system, contemplated actions include those that protect the voltage profile of the system and protect against transformer damage. Exemplary of such actions are unloading transmissions by reducing economic transfers and/or dispatching one or more generators to minimum load levels, possibly including removing a generator from the network.

We claim:

1. Method of operating an installation, the installation comprising one or more long electrical conductors extending over a geographic region; and means, connected to the conductor or conductors, for causing the flow of electric current in said one or more of the conductors; said method comprising:
    a) obtaining data comprising substantially real-time data representative of the time derivative of Earth's magnetic field at or near Earth's surface at a multiplicity of locations including one or more locations within the geographic region, said derivative to be designated dB/dt;
    b) comparing all or part of said data, or of quantities derived from said data, to pre-determined critical values; and
    c) if indicated by the result of the comparison of b), changing the operating conditions of the installation such that the installation is less vulnerable to the effects of geomagnetically induced currents.

2. Method of claim 1, wherein the data comprises a "sudden storm commencement" signal, wherein the operating conditions of the installation include an alert status, and wherein step c) comprises changing the alert status of the installation.

3. Method of claim 1, wherein at least some of the dB/dt data is displayed in the form of contour lines of equal dB/dt superimposed on a representation of at least a part of said installation.

4. Method of claim 1, wherein said data further comprises data representative of the voltage induced in a given long conductor by changes in Earth's magnetic field and data representative of Earth's electrical potential at a given location.

5. Method of claim 1, wherein step a) comprises receiving and collecting data representative of dB/dt at a multiplicity of locations outside of the geographic region.

6. Method of claim 5, wherein at least some of the dB/dt data is displayed in the form of contour lines of equal dB/dt superimposed on a representation of a given geographic region, and wherein the method comprises displaying, dB/dt data pertaining to two or more geographic regions of different spatial scales.

7. Method of claim 1, wherein at least some of the predetermined critical values take account of geologic information.

8. Method of claim 1, wherein said data further comprises data representative of Earth's electrical potential at a given location.

9. Method of claim 1, wherein step a) comprises collecting data representative of dB/dt at a multiplicity of locations outside of the geographic region.

* * * * *